(12) United States Patent
Suzuki

(10) Patent No.: US 7,765,857 B2
(45) Date of Patent: Aug. 3, 2010

(54) INTERNAL COMBUSTION ENGINE SYSTEM AND MISFIRE DETERMINING METHOD FOR INTERNAL COMBUSTION ENGINE

(75) Inventor: Takashi Suzuki, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 12/226,781

(22) PCT Filed: May 2, 2007

(86) PCT No.: PCT/JP2007/059370

§ 371 (c)(1),
(2), (4) Date: Oct. 28, 2008

(87) PCT Pub. No.: WO2007/129657

PCT Pub. Date: Nov. 15, 2007

(65) Prior Publication Data

US 2009/0118990 A1    May 7, 2009

(30) Foreign Application Priority Data

May 9, 2006    (JP)    ............................. 2006-130698

(51) Int. Cl.
*G01M 15/11*    (2006.01)
(52) U.S. Cl. ................................. 73/114.04
(58) Field of Classification Search .............. 73/114.02, 73/114.04, 114.07
See application file for complete search history.

(56) References Cited

U.S. PATENT DOCUMENTS

| 5,906,651 | A | | 5/1999 | Amano |
| 6,158,273 | A | * | 12/2000 | Jeremiasson et al. ...... 73/114.02 |
| 6,434,541 | B1 | * | 8/2002 | Tawel et al. .................... 706/30 |
| 6,962,224 | B2 | * | 11/2005 | Nakanowatari ........ 180/65.225 |
| 7,503,207 | B2 | * | 3/2009 | Nishigaki et al. ......... 73/114.02 |
| 7,503,208 | B2 | * | 3/2009 | Akimoto et al. .......... 73/114.03 |
| 7,543,483 | B2 | * | 6/2009 | Akimoto et al. .......... 73/114.03 |

(Continued)

FOREIGN PATENT DOCUMENTS

DE    199 39 250 A1    3/2001

(Continued)

OTHER PUBLICATIONS

May 4, 2010 Extended Supplementary European Search Report issued in EP Patent Application No. 07742805.0.

*Primary Examiner*—Lisa M Caputo
*Assistant Examiner*—Freddie Kirkland, III
(74) *Attorney, Agent, or Firm*—Oliff & Berridge, PLC

(57) ABSTRACT

An influence component $N30m$ of every 30 degrees in a 30 degree rotation speed $N30$ base as time required for 30 degree rotation of a crankshaft is calculated by using a frequency characteristic of an influence given to a rotation fluctuation of a crankshaft by output torque output from a motor, which is calculated by using a mechanical model and an amplitude P and a phase q at a time of vibration control by the motor, a determination duration $T30j$ is calculated by subtracting an influence component $T30m$ as an inverse number of this from 30 degree duration $T30$, and misfire of an engine is determined by comparing the calculated determination duration $T30j$ with a threshold value Tref. Thereby, misfire of the engine outputting power to a post-stage via a damper can be determined more reliably and accurately.

8 Claims, 5 Drawing Sheets

U.S. PATENT DOCUMENTS

| | | | |
|---|---|---|---|
| 7,665,558 B2* | 2/2010 | Akimoto et al. | 180/65.28 |
| 2003/0173123 A1 | 9/2003 | Nakanowatari | |
| 2008/0148835 A1* | 6/2008 | Akimoto et al. | 73/116.01 |
| 2009/0145210 A1* | 6/2009 | Suzuki | 73/114.04 |
| 2009/0151469 A1* | 6/2009 | Suzuki | 73/847 |
| 2009/0158829 A1* | 6/2009 | Suzuki | 73/114.02 |
| 2009/0308145 A1* | 12/2009 | Suzuki | 73/114.04 |
| 2010/0050753 A1* | 3/2010 | Suzuki | 73/114.04 |

FOREIGN PATENT DOCUMENTS

| | | |
|---|---|---|
| EP | 1 396 368 A2 | 3/2004 |
| JP | A-2000-32607 | 1/2000 |
| JP | A-2001-65402 | 3/2001 |
| JP | A-2004-312857 | 11/2004 |
| WO | WO 01/14944 A1 | 3/2001 |

\* cited by examiner

US 7,765,857 B2

INTERNAL COMBUSTION ENGINE SYSTEM AND MISFIRE DETERMINING METHOD FOR INTERNAL COMBUSTION ENGINE

TECHNICAL FIELD

The present invention relates to an internal combustion engine system, a misfire determining method for an internal combustion engine, and a vehicle equipped with the internal combustion engine system, and more particularly relates to an internal combustion engine system having a multi-cylinder internal combustion engine capable of outputting power to a drive shaft via a torsional element, a misfire determining method for the multi-cylinder internal combustion engine capable of outputting power to the drive shaft via the torsional element, and a vehicle equipped with the internal combustion system.

BACKGROUND ART

Conventionally, as an internal combustion engine system of this kind, there is proposed the one that determines misfire of an engine based on a torque correction amount of a motor at the time of vibration control for canceling off a torque fluctuation of the engine by the motor in a vehicle mounted with the motor that is capable of generating electric power and connected to the crankshaft of the engine (for example, see Patent Document 1). In this system, a misfire is determined based on the rotation fluctuation at a crank angle position when vibration control by the motor is not carried out, and when the engine is operated at high rotation with high torque even though the vibration control by the motor is carried out, and misfire of the engine is determined based on the torque correction amount of the motor at the time of vibration control when the engine is operated at low rotation or operated with low torque while the vibration control by the motor is carried out.

Patent Document 1: Japanese Patent Laid-Open No. 2001-65402

DISCLOSURE OF THE INVENTION

When the vibration control by the motor is conducted, determination of misfire becomes difficult with the conventional misfire determining method as in the above describe system, but the factor which makes determination of misfire difficult is not limited to such vibration control. For example, when an engine is connected to a transmission or the like via a torsional element such as a damper which is used for the purpose of suppressing torque fluctuation of the engine, the entire transmission including the damper resonates depending on the operation point of the engine, and determination of misfire becomes difficult.

It is an object of the present invention to provide an internal combustion system, a misfire determining method for the internal combustion engine and a vehicle that ensure reliable determination of the misfire of the multi-cylinder internal combustion engine capable of outputting power to the drive shaft via a torsional element such as a damper. Further, it is an object of the present invention to provide the internal combustion system, the misfire determining method for the internal combustion engine and the vehicle that ensure accurate determination of the misfire of the multi-cylinder internal combustion engine capable of outputting power to the drive shaft via a torsional element such as a damper.

In order to attain at least part of the above described objects, the internal combustion system, the misfire determining method for the internal combustion engine and the vehicle of the present invention adopts the following measures.

The present invention according to one aspect is an internal combustion engine system having a multi-cylinder internal combustion engine capable of outputting power to a drive shaft via a torsional element, said internal combustion engine system comprising: a rotation regulating module connected to an output shaft of said internal combustion engine via said torsional element and connected to said drive shaft to be capable of regulating a rotation speed and rotation fluctuation of the internal combustion engine; a rotational position detecting module detecting a rotational position of the output shaft of said internal combustion engine; a rotation fluctuation calculating module calculating the rotation fluctuation of said internal combustion engine based on said detected rotational position; an influence component calculating module calculating an influence component given to the rotation fluctuation of the internal combustion engine by regulation of the rotation speed and the rotation fluctuation of said internal combustion engine by said rotation regulating module; and a misfire determining module determining whether or not any of cylinders of said internal combustion engine misfires based on said calculated rotation fluctuation of the internal combustion engine and said calculated influence component.

In the internal combustion engine system of the present invention, the rotation fluctuation of the internal combustion engine is calculated based on a rotational position of the output shaft of the internal combustion engine, an influence component, which is given to the rotation fluctuation of the internal combustion engine by regulation of the rotation speed and rotation fluctuation of the internal combustion engine by the rotation regulating module, is calculated, and based on the calculated rotation fluctuation of the internal combustion engine and the calculated influence component, it is determined whether or not any of cylinders of the internal combustion engine misfires. Specifically, misfire is determined by considering the influence component given to the rotation fluctuation of the internal combustion engine by the rotation regulating module. Thereby, misfire of the internal combustion engine outputting power to the drive shaft via the torsional element can be determined more reliably and accurately.

In such an internal combustion engine of the present invention, the influence component calculating module may be a module calculating the influence component based on a transfer function in an influence given to the rotation fluctuation of the internal combustion engine with respect to torque output of the rotation regulating module, which is obtained by solving an equation of motion for a mechanical model including the internal combustion engine, the torsional element and the rotation regulating module, and an amplitude and a phase of the torque output of the rotation regulating module.

Further, in the internal combustion engine system of the present invention, the misfire determining module may be a module which determines misfire based on an influence-removed rotation fluctuation which is a rotation fluctuation obtained by subtracting the calculated influence component from the calculated rotation fluctuation of the internal combustion engine. In this case, the misfire determining module may be a module which determines that misfire is occurring when an inverse number of the influence-removed rotation fluctuation is not less than a threshold value.

Further, in the internal combustion engine system of the present invention, the rotation regulating module may be a module capable of inputting and outputting power from and to the output shaft and the drive shaft with input and output of electric power and power. In this case, the rotation regulating module may be a module which includes a three shaft-type power input and output module which is connected to three shafts that are the output shaft of the internal combustion engine, the drive shaft and a rotating shaft, and based on power inputted to and outputted from any two shafts of the three shafts, inputs and outputs power to and from the remaining shaft, and a motor capable of inputting and outputting power to and from the rotating shaft.

The present invention according to another aspect is a misfire determining method for an internal combustion engine for determining misfire of said internal combustion engine in an internal combustion engine system including a multi-cylinder internal combustion engine, and a rotation regulating module connected to an output shaft of said internal combustion engine via a torsional element and connected to a drive shaft to be capable of regulating a rotation speed and rotation fluctuation of the internal combustion engine, wherein the rotation fluctuation of said internal combustion engine is calculated based on a rotational position of the output shaft of said internal combustion engine, an influence component, which is given to the rotation fluctuation of the internal combustion engine by regulation of the rotation speed and rotation fluctuation of said internal combustion engine by said rotation regulating module, is calculated, and based on a rotation fluctuation obtained by subtracting said calculated influence component from said calculated rotation fluctuation of the internal combustion engine, it is determined whether or not any of cylinders of said internal combustion engine misfires.

In a misfire determining method of an internal combustion engine of the present invention, the rotation fluctuation of the internal combustion engine is calculated based on a rotational position of the output shaft of the internal combustion engine, an influence component, which is given to the rotation fluctuation of the internal combustion engine by regulation of the rotation speed and rotation fluctuation of the internal combustion engine by the rotation regulating module, is calculated, and based on the calculated rotation fluctuation of the internal combustion engine and the calculated influence component, it is determined whether or not any of cylinders of the internal combustion engine misfires. Specifically, misfire is determined by considering the influence component given to the rotation fluctuation of the internal combustion engine by the rotation regulating module. Thereby, misfire of the internal combustion engine outputting power to the drive shaft via the torsional element can be determined more reliably and accurately.

In the misfire determining method of the present invention, the influence component may be calculated based on a transfer function in an influence given to the rotation fluctuation of said internal combustion engine with respect to torque output of said rotation regulating module, which is obtained by solving an equation of motion for a mechanical model including said internal combustion engine, said torsional element and said rotation regulating module, and an amplitude and a phase of the torque output of said rotation regulating module.

In the misfire determining method of the present invention, misfire may be determined based on influence-removed rotation fluctuation which is rotation fluctuation obtained by subtracting said calculated influence component from said calculated rotation fluctuation of the internal combustion engine.

The present invention according to another aspect is a vehicle comprising: a multi-cylinder internal combustion engine capable of outputting power to a drive shaft connected to an axle via a torsional element; a rotation regulating module connected to an output shaft of said internal combustion engine via said torsional element and connected to said drive shaft to be capable of regulating a rotation speed and rotation fluctuation of the internal combustion engine; a rotational position detecting module detecting a rotational position of the output shaft of said internal combustion engine; a rotation fluctuation calculating module calculating the rotation fluctuation of said internal combustion engine based on said detected rotational position; an influence component calculating module calculating an influence component given to the rotation fluctuation of the internal combustion engine by regulation of the rotation speed and rotation fluctuation of said internal combustion engine by said rotation regulating module; and a misfire determining module determining whether or not any of cylinders of said internal combustion engine misfires based on said calculated rotation fluctuation of the internal combustion engine and said calculated influence component.

In a vehicle of the present invention, the rotation fluctuation of the internal combustion engine is calculated based on a rotational position of the output shaft of the internal combustion engine, an influence component, which is given to the rotation fluctuation of the internal combustion engine by regulation of the rotation speed and rotation fluctuation of the internal combustion engine by the rotation regulating module, is calculated, and based on the calculated rotation fluctuation of the internal combustion engine and the calculated influence component, it is determined whether or not any of cylinders of the internal combustion engine misfires. Specifically, misfire is determined by considering the influence component given to the rotation fluctuation of the internal combustion engine by the rotation regulating module. Thereby, misfire of the internal combustion engine outputting power to the drive shaft via the torsional element can be determined more reliably and accurately.

BEST MODE FOR CARRYING OUT THE INVENTION

Figure 1:
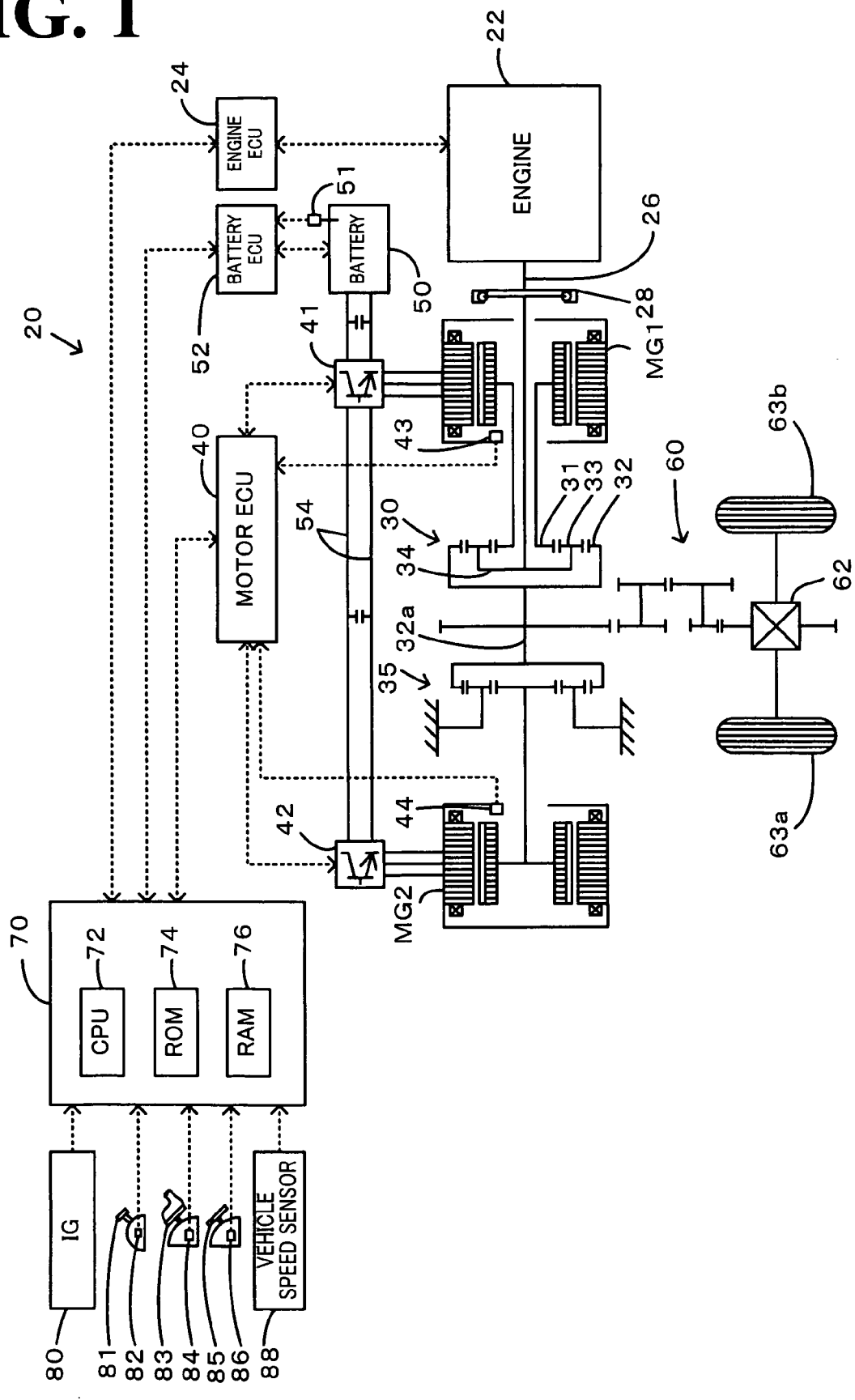
FIG. 1 is a configuration diagram showing the outline of the configuration of a hybrid automobile 20 which is one embodiment of the present invention.

Next, the best mode for carrying out the present invention will be described by using an embodiment. FIG. 1 is a configuration diagram showing the outline of the configuration of a hybrid automobile 20 equipped with an internal combustion engine system which is one embodiment of the present invention. The hybrid automobile 20 of the embodiment includes an engine 22, a three-axis power distribution and integration mechanism 30 which is connected to a crankshaft 26 as an output shaft of the engine 22 via a damper 28 as a torsional element, a motor MG1 which is connected to the power distribution and integration mechanism 30 and capable of generating electric power, a reduction gear 35 mounted to a ring gear shaft 32a as a drive shaft connected to the power distribution and integration mechanism 30, a motor MG2 connected to the reduction gear 35, and a hybrid electronic control unit 70 which controls the entire vehicle. Here, the engine 22, the power distribution and integration mechanism 30 connected to the engine 22 via the damper 28, the motor MG1, and an engine electronic control unit 24 mainly correspond to the internal combustion engine system of the embodiment.

Figure 2:
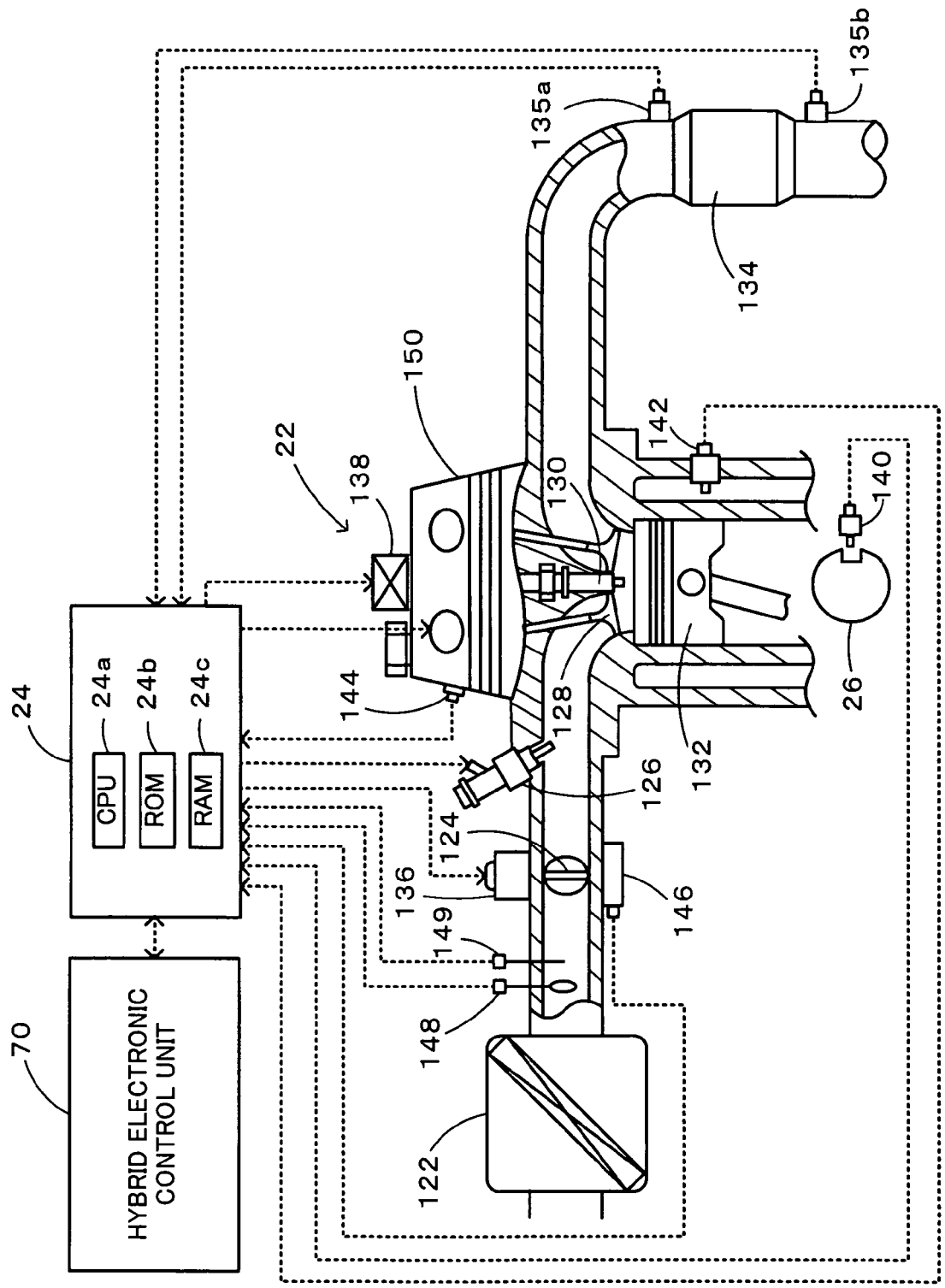
FIG. 2 is a configuration diagram showing the outline of the configuration of an engine 22.

The engine 22 is a six-cylinder internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port, signals from various sensors that measure and detect the conditions of the engine 22. The signals input into the engine ECU 24 include a crank position from a crank position sensor 140 detected as the rotational position of the crankshaft 23, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal AF from an air flow meter 148 attached to an air intake conduit, an intake air temperature from a temperature sensor 149 attached to the air intake conduit, an air-fuel ratio AF from an air-fuel ratio sensor 135a, and an oxygen signal from an oxygen sensor 135b. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 3:
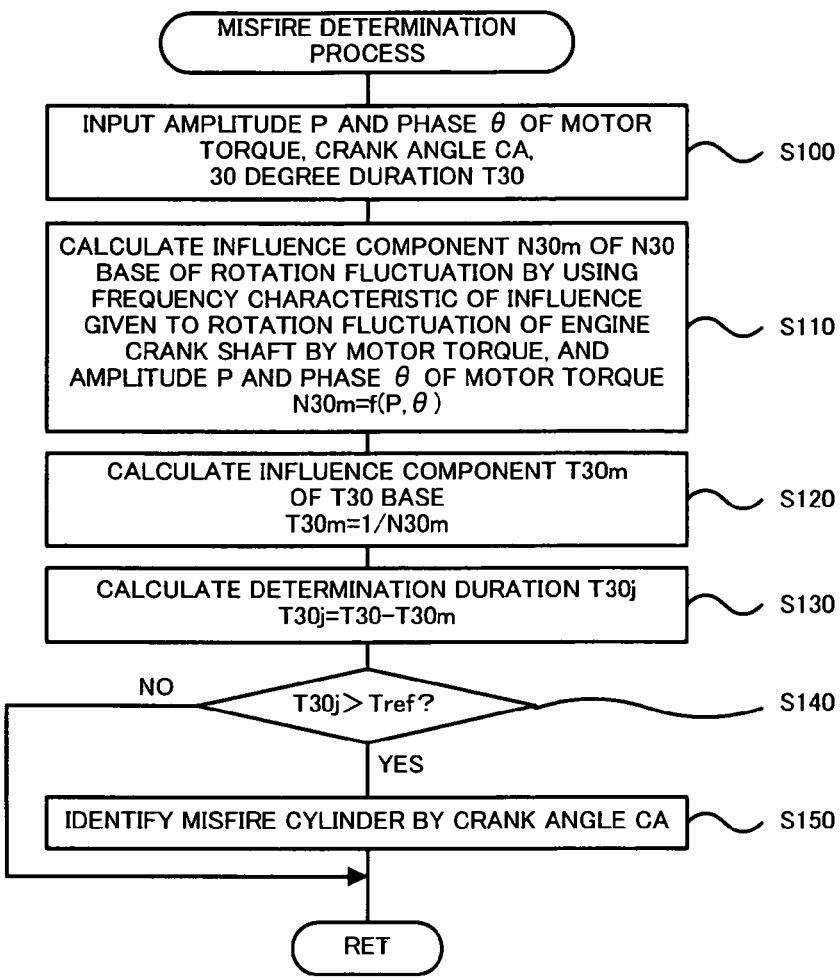
FIG. 3 is a flowchart showing an example of the misfire determining process carried out by an engine ECU 24.

Next, the operation at the time of determining whether any cylinder of the engine 22, which is mounted on the hybrid automobile 20 of the embodiment thus configured, misfires or not will be described. FIG. 3 is a flowchart showing an example of a misfire determination process routine which is executed by the engine ECU 24. The routine is repeatedly executed every predetermined time.

Figure 4:
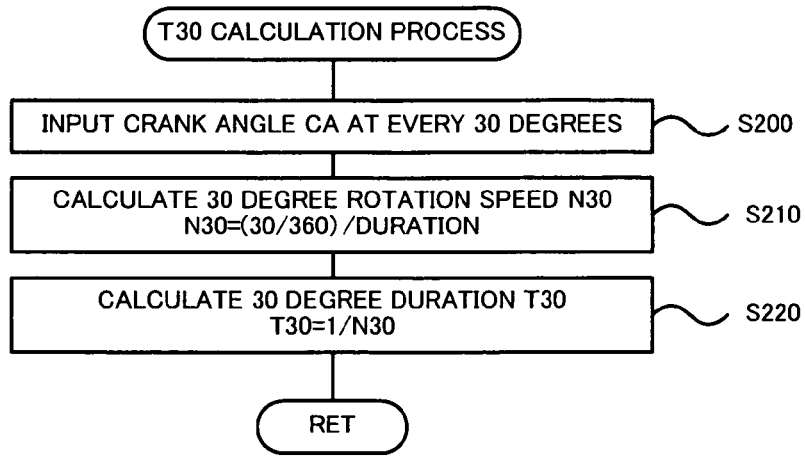
FIG. 4 is a flowchart showing an example of the calculation process of a 30 degree duration T30.

When the misfire determination process is executed, the CPU 24a of the engine ECU 24 executes the process of inputting data required for misfire determination such as an amplitude P and a phase θ of torque pulsation in the vibration control for suppressing rotation fluctuation of a post-stage side from the damper 28 by the motor MG1, a crank angle CA from the crank position sensor 140, a 30 degree duration T30 which is the time required for rotation of 30 degrees of the crank angle CA which is calculated by a T30 calculation process shown as an example in FIG. 4 (step S100). The motor ECU 40 controls the motor MG1 to output the torque as the sum of the torque for regulating the rotation speed Ne of the engine 22 and the torque for canceling off rotation fluctuation, which is in the inverse phase with respect to the rotation fluctuation of the post-stage from the damper 28 for suppressing the rotation fluctuation of the post-stage side of the damper 28, and therefore, the amplitude P and the phase θ of the torque pulsation in the vibration control by the motor MG1 can be obtained from fluctuation of a torque command Tm1* for the motor MG1 by the motor ECU 40. The 30 degree duration T30 can be obtained from the T30 calculation process shown as an example in FIG. 4 which is executed by the engine ECU 24, that is, by inputting the crank angle CA at every 30 degrees from the reference crank angle (step S200), calculating a 30 degree rotation speed N30 by dividing the crank angle CA at every 30 degrees by the time required for rotating the crankshaft 26 by 30 degrees (step S210), and by taking the inverse number of the calculated 30 degree rotation speed N30 (step S220).

Figure 5:
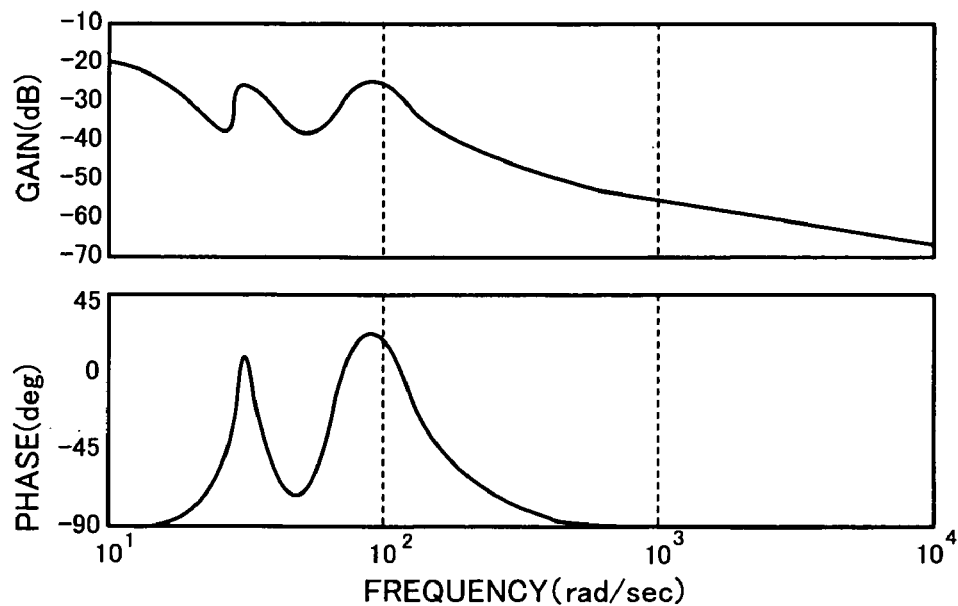
FIG. 5 is an explanatory diagram showing an example of a board diagram of a frequency characteristic of an influence given to the rotation fluctuation of a crankshaft 26 by output torque of a motor MG1.
Figure 6:
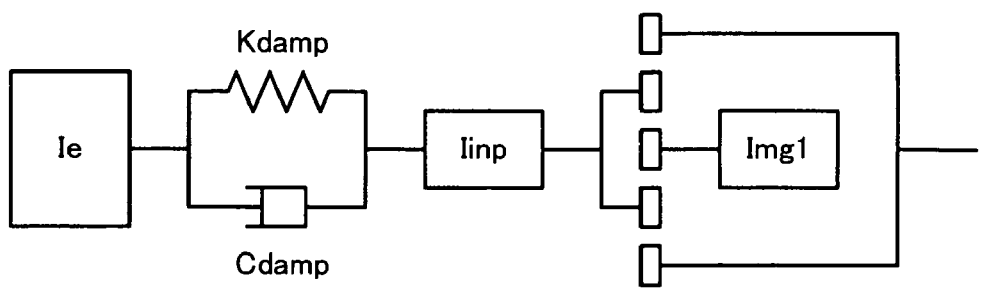
FIG. 6 is an explanatory diagram showing an example of a mechanical model ignoring the influence of the post-stage from the motor MG1.

After the data is thus input, an influence component N30m of the 30 degree rotation speed N30 base of the rotation fluctuation is calculated by using the frequency characteristic of the influence given to the rotation fluctuation of the crankshaft 26 by the output torque of the motor MG1, and the amplitude P and the phase θ of the torque pulsation in the vibration control by the motor MG1 that are input (step S110). An example of the Bode diagram of the frequency characteristic of the influence which is given to the rotation fluctuation of the crankshaft 26 by the output torque of the motor MG1 in the hybrid automobile 20 of the embodiment is shown in FIG. 5. In the embodiment, the frequency characteristic is calculated by using a mechanical model shown in FIG. 6 ignoring the influence of the post-stage from the motor MG1. In FIG. 6, "Ie" represents inertia of the engine 22, "Kdamp" represents a spring constant of the damper 28, "Cdamp" represents a damping coefficient of the damper 28, "Iinp" represents inertia of the input shaft (shaft between the damper 28 and the power distribution and integration mechanism 30) of the power distribution and integration mechanism 30, and "Img1" represents inertia of the motor MG1. When the equations of motion are established for the two inertia systems by using this, the following equations (1) and (2) are obtained. In equations (1) and (2), "ωe" represents a rotation angular velocity of the crankshaft 26, "ωinp" represents a rotation angular velocity of the input shaft of the power distribution and integration mechanism 30, "θe" represents a torsion angle per unit length of the crankshaft 26, "θinp" represents a torsion angle per unit length of the input shaft of the power distribution and integration mechanism 30, "Te" represents engine torque, "Tmg1" represents output torque of the motor MG1, and dots on the tops of "ωe" and "ωinp" show that "ωe" and "ωinp" are differentiated by one time. Now that the influence on the crankshaft 26 with respect to the torque of the motor MG1 is considered, if the value of the engine torque Te is set as zero, equation (3) is obtained. Here, when the matrix at the left of the left side of equation (3) is set as "P", the matrix at the left of the first term of the right side is set as "A", the matrix at the left of the second term of the right side is set as "B", the matrix at the right of the first term of the right side is set as "x", and the output torque Tmg1 of the motor MG1 is set as "u", equation (3) is expressed as equation (4). The rotation angular velocity ωe of the crankshaft 26 becomes the left half of equation (5) when expressed by using "x", and when the matrix at the left of the right side of the left half of equation (5) is set as "C", the rightmost side of equation (5) is obtained. By solving equation (4) by using the relationship, equation (6) can be derived as a transfer function G (s) of the influence which the output torque Tmg1 of the motor MG1 exerts on the rotation angular speed (ωe) of the crankshaft 26. In the embodiment, the transfer function G(s) is obtained by such calculation, and the frequency characteristic is obtained from this. From this frequency characteristic and the amplitude P and the phase θ of the torque pulsation in the vibration control by the motor MG1, the influence component which the output torque Tmg1 of the motor MG1 exerts on the rotation angular speed (ωe) of the crankshaft 26 is obtained as the rotation fluctuation at every 30 degrees (influence component N30*m*).

$$Ie \cdot \dot{\omega}e = Cdamp(\omega inp - \omega e) + Kdamp(\theta inp - \theta e) + Te \quad (1)$$

$$Iinp \cdot \dot{\omega}inp = Cdamp(-\omega inp + \omega e) + Kdamp(-\theta inp + \theta e) + Tmg1 \quad (2)$$

$$\begin{bmatrix} 1 & 0 & 0 & 0 \\ 0 & 1 & 0 & 0 \\ 0 & 0 & Ie & 0 \\ 0 & 0 & 0 & Iinp \end{bmatrix} \cdot \begin{bmatrix} \dot{\omega}e \\ \dot{\omega}inp \\ \dot{\omega}e \\ \dot{\omega}inp \end{bmatrix} = \begin{bmatrix} 0 & 0 & 1 & 0 \\ 0 & 0 & 0 & 1 \\ -Kdamp & Kdamp & -Cdamp & Cdamp \\ Kdamp & -Kdamp & Cdamp & -Cdamp \end{bmatrix} \cdot \begin{bmatrix} \theta e \\ \theta inp \\ \omega e \\ \omega inp \end{bmatrix} + \begin{bmatrix} 0 \\ 0 \\ 0 \\ 1 \end{bmatrix} \cdot Tmg1 \quad (3)$$

$$P\dot{x} = Ax + Bu \quad (4)$$

$$\omega e = [0\,0\,1\,0] \cdot \begin{bmatrix} \theta e \\ \theta inp \\ \omega e \\ \omega inp \end{bmatrix} = Cx \quad (5)$$

$$G(s) = C * (sI - P^{-1}A)^{-1} * P^{-1}B \quad (6)$$

Subsequently, the inverse number of the obtained influence component N30*m* is taken, and an influence component T30*m* of the degree duration T30 base is calculated (step S120), and a determination duration T30*j* is calculated by subtracting the influence component T30*m* from the input 30 degree duration T30 (step S130). The determination duration T30*j* is the duration from which the influence of the vibration control by the motor MG1 is removed, namely, the duration from which the influence of resonance by the damper 28 is removed when resonance is caused by the damper 28. Subsequently, it is determined whether or not the determination duration T30*j* is larger than a threshold value Tref (step S140), when the determination duration T30*j* is larger than the threshold value Tref, it is determined that misfire occurs, and the cylinder which misfires is identified based on the input crank angle CA (step S150), and the misfire determination process is finished. In this case, the threshold value Tref is set at the value larger than the determination duration T30*j* when the cylinder which is in the combustion stroke at the crank angle CA as the reference of the determination duration T30*j* does not misfire, and smaller than the determination duration T30*j* when the cylinder misfires, and can be obtained by the experiment or the like. The cylinder which misfires can be identified as the cylinder which is in the combustion stroke at the crank angle CA that is the reference of the determination duration T30*j* exceeding the threshold value Tref.

According to the internal combustion engine system mounted on the hybrid automobile 20 of the embodiment described above, misfire is determined by using the determination duration T30*j* from which the influence of vibration control by the motor MG1 is removed, and therefore, misfire of the engine 22 which outputs power to the post-stage through the damper 28 as the torsional element can be determined more reliably and accurately. Accordingly, even when resonance by the damper 28 occurs, misfire of the engine 22 can be determined more reliably and accurately.

In the internal combustion engine system mounted on the hybrid automobile 20 of the embodiment, the frequency characteristic of the influence which the output torque of the motor MG1 gives to the rotation fluctuation of the crankshaft 26 is calculated by using the mechanical model ignoring the influence of the post-stage from the motor MG1, but the frequency characteristic may be calculated by using the mechanical model also considering the influence of the post-stage from the motor MG1.

In the internal combustion engine system mounted on the hybrid automobile 20 of the embodiment, misfire of the engine 22 is determined by using the 30 degree duration T30 as the time required for 30 degree rotation of the crankshaft 26 at every 30 degrees, but misfire of the engine 22 may be determined by using various durations such as five degree duration time T5 as the time required for five degree rotation of the crankshaft 26 at every five degrees, and 10 degree duration T10 as the time required for 10 degree rotation of the crankshaft 26 at every 10 degrees.

In the internal combustion engine system mounted on the hybrid automobile 20 of the embodiment, the determination duration T30*j* is calculated by subtracting the influence component T30*m* of the 30 degree duration T30 base calculated by using the mechanical model from the 30 degree duration T30, and misfire of the engine 22 is determined from the calculated determination duration T30*j*. However, the determination duration may be calculated by subtracting the influence component of a 30 degree duration T30 base which is obtained without using the mechanical model from the 30 degree duration T30, and misfire of the engine 22 may be determined from the calculated determination duration. As one example of the method for obtaining the influence component of the 30 degree duration T30 base without using the mechanical model, the influence of the 30 degree duration T30 base which is given to the rotation fluctuation of the crankshaft 26 with respect to the amplitude P and the phase θ of the torque pulsation in the vibration control by the motor MG1 is obtained in advance by an experiment or the like, and is stored in the ROM 24*b* as a map, and when the amplitude P and the phase θ are given, a corresponding influence component of the 30 degree duration T30 base is derived according to the map.

Figure 7:
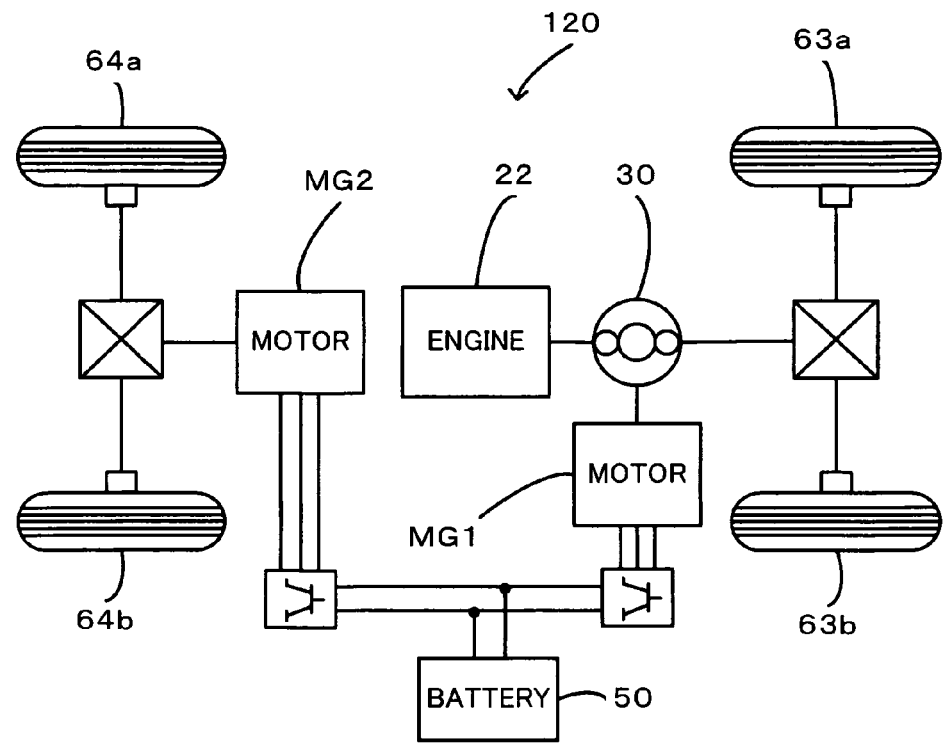
FIG. 7 is a configuration diagram showing the outline of the configuration of a hybrid automobile 120 of a modified example.
Figure 8:
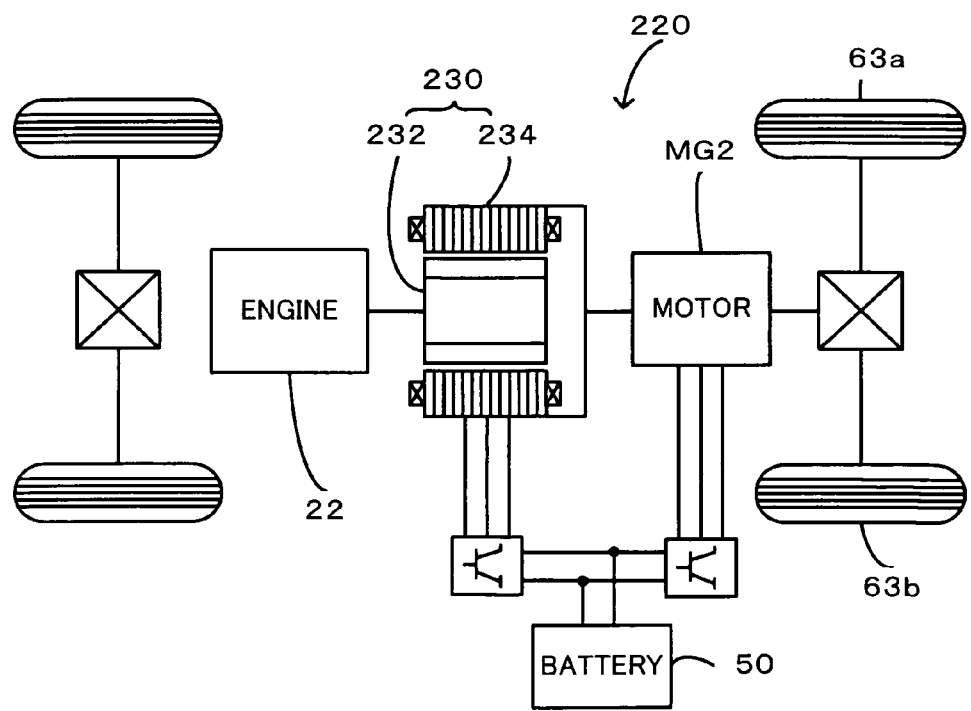
FIG. 8 is a configuration diagram showing the outline of the configuration of a hybrid automobile 220 of a modified example.

In the hybrid automobile 20 of the embodiment, misfire of the engine 22 in the system including the power distribution and integration mechanism 30 which is connected to the crankshaft 26 of the engine 22 via the damper 28 as the torsional element, and is connected to the ring gear shaft 32*a* as the rotating shaft and the drive shaft of the motor MG1, and the motor MG2 which is connected to the ring gear shaft 32*a* via the reduction gear 35, but the present invention may be applied to any engine system in which the crankshaft of the engine is connected to the motor or the like capable of regulating the rotation speed of the engine via the damper as the torsional element. Therefore, misfire of the engine 22 may be determined in the system in which the power of the motor MG2 is connected to an axle (axle connected to wheels 64a and 64b in FIG. 7) different from the axle (axle to which the drive wheels 63a and 63b are connected) to which the ring gear shaft 32a is connected as shown as an example in a hybrid automobile 120 of a modified example of FIG. 7, or misfire of the engine 22 may be determined in the system including a pair rotor motor 230 which has an inner rotor 232 connected to the crankshaft 26 of the engine 22 via the damper 28 and an outer rotor 234 connected to the drive shaft outputting the power to the drive wheels 63a and 63b, transmits part of the power of the engine 22 to the drive shaft, and converts the residual power into electric power.

Further, the internal combustion engine system is not limited to the internal combustion engine system mounted on such a hybrid automobile, but may be the internal combustion engine system having an internal combustion engine mounted on a movable body other than an automobile, or an internal combustion engine incorporated in immobile equipment such as construction equipment. Further, the present invention may be in the mode of the misfire determining method for an internal combustion engine.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The present invention is applicable to the manufacturing industry of the internal combustion engine systems having internal combustion engines and automobiles equipped with them.

The invention claimed is:

1. An internal combustion engine system having a multi-cylinder internal combustion engine capable of outputting power to a drive shaft via a torsional element, said internal combustion engine system comprising:
a rotation regulating module connected to an output shaft of said internal combustion engine via said torsional element and connected to said drive shaft to be capable of regulating a rotation speed and rotation fluctuation of the internal combustion engine;
a rotational position detecting module detecting a rotational position of the output shaft of said internal combustion engine;
a rotation fluctuation calculating module calculating the rotation fluctuation of said internal combustion engine based on said detected rotational position;
an influence component calculating module calculating an influence component given to the rotation fluctuation of the internal combustion engine by regulation of the rotation speed and the rotation fluctuation of said internal combustion engine by said rotation regulating module, based on a transfer function in an influence given to the rotation fluctuation of said internal combustion engine with respect to torque output of said rotation regulating module, which is obtained by solving an equation of motion for a mechanical model including said internal combustion engine, said torsional element and said rotation regulating module, and an amplitude and a phase of the torque output of said rotation regulating module; and
a misfire determining module determining whether or not any of cylinders of said internal combustion engine misfires based on said calculated rotation fluctuation of the internal combustion engine and said calculated influence component.

2. An internal combustion engine system according to claim 1, wherein said misfire determining module is a module which determines misfire based on an influence-removed rotation fluctuation which is a rotation fluctuation obtained by subtracting said calculated influence component from said calculated rotation fluctuation of the internal combustion engine.

3. An internal combustion engine system according to claim 2, wherein said misfire determining module is a module which determines that misfire is occurring when an inverse number of said influence-removed rotation fluctuation is not less than a threshold value.

4. An internal combustion engine system according to claim 1, wherein said rotation regulating module is a module which is capable of inputting and outputting power from and to said output shaft and said drive shaft with input and output of electric power and power.

5. An internal combustion engine system according to claim 4, wherein said rotation regulating module is a module which includes a three shaft-type power input and output module which is connected to three shafts that are the output shaft of said internal combustion engine, said drive shaft and a rotating shaft, and based on power inputted to and outputted from any two shafts of the three shafts, inputs and outputs power to and from the remaining shaft, and a motor capable of inputting and outputting power to and from said rotating shaft.

6. A misfire determining method for an internal combustion engine for determining misfire of said internal combustion engine in an internal combustion engine system including a multi-cylinder internal combustion engine, and a rotation regulating module connected to an output shaft of said internal combustion engine via a torsional element and connected to a drive shaft to be capable of regulating a rotation speed and rotation fluctuation of the internal combustion engine, wherein the rotation fluctuation of said internal combustion engine is calculated based on a rotational position of the output shaft of said internal combustion engine, an influence component, which is given to the rotation fluctuation of the internal combustion engine by regulation of the rotation speed and rotation fluctuation of said internal combustion engine by said rotation regulating module, is calculated based on a transfer function in an influence given to the rotation fluctuation of said internal combustion engine with respect to torque output of said rotation regulating module, which is obtained by solving an equation of motion for a mechanical model including said internal combustion engine, said torsional element and said rotation regulating module, and an amplitude and a phase of the torque output of said rotation regulating module, and based on a rotation fluctuation obtained by subtracting said calculated influence component from said calculated rotation fluctuation of the internal combustion engine, it is determined whether or not any of cylinders of said internal combustion engine misfires.

7. A misfire determining method for an internal combustion engine according to claim 6, wherein misfire is determined based on influence-removed rotation fluctuation which is rotation fluctuation obtained by subtracting said calculated influence component from said calculated rotation fluctuation of the internal combustion engine.

8. A vehicle, comprising:
a multi-cylinder internal combustion engine capable of outputting power to a drive shaft connected to an axle via a torsional element;
a rotation regulating module connected to an output shaft of said internal combustion engine via said torsional element and connected to said drive shaft to be capable of regulating a rotation speed and rotation fluctuation of the internal combustion engine;
a rotational position detecting module detecting a rotational position of the output shaft of said internal combustion engine;
a rotation fluctuation calculating module calculating the rotation fluctuation of said internal combustion engine based on said detected rotational position;
an influence component calculating module calculating an influence component given to the rotation fluctuation of the internal combustion engine by regulation of the rotation speed and rotation fluctuation of said internal combustion engine by said rotation regulating module, based on a transfer function in an influence given to the rotation fluctuation of said internal combustion engine with respect to torque output of said rotation regulating module, which is obtained by solving an equation of motion for a mechanical model including said internal combustion engine, said torsional element and said rotation regulating module, and an amplitude and a phase of the torque output of said rotation regulating module; and
a misfire determining module determining whether or not any of cylinders of said internal combustion engine misfires based on said calculated rotation fluctuation of the internal combustion engine and said calculated influence component.

* * * * *